July 21, 1936. R. GAHL 2,048,113
REACTION CHAMBER FOR REACTIONS OF MAGNETIC SUBSTANCES WITH FLUIDS
Filed Jan. 9, 1934
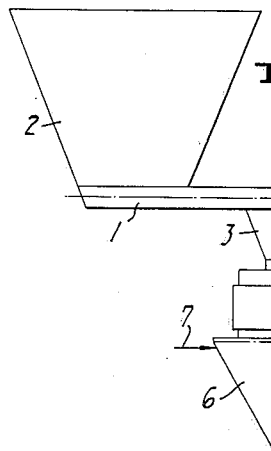
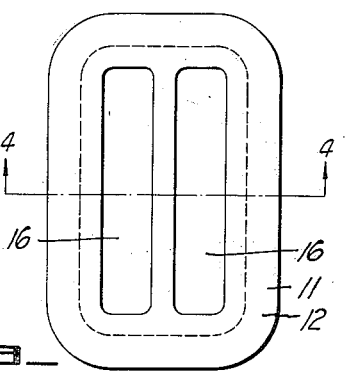
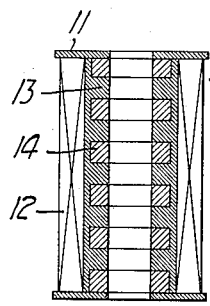
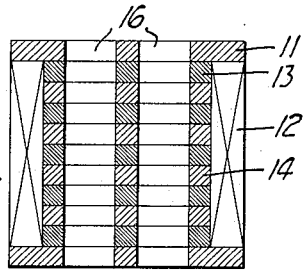
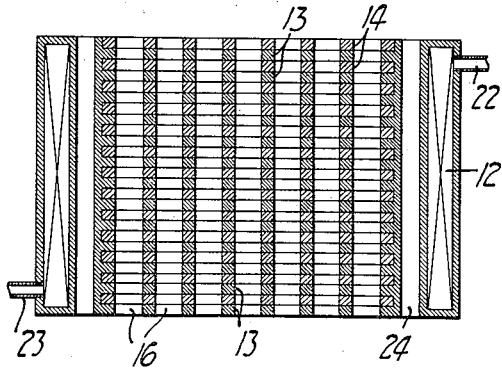
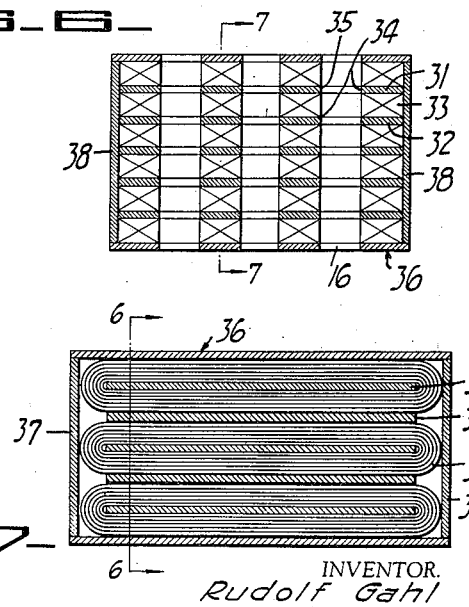
INVENTOR.
Rudolf Gahl
BY Robert H. Eckhoff
ATTORNEY.

Patented July 21, 1936

2,048,113

UNITED STATES PATENT OFFICE 2,048,113

REACTION CHAMBER FOR REACTIONS OF MAGNETIC SUBSTANCES WITH FLUIDS

Rudolf Gahl, Berkeley, Calif.

Application January 9, 1934, Serial No. 705,915

9 Claims. (Cl. 266—1)

I have outlined processes in which magnetic substances may be made to react with fluids in my copending application Serial #666,686, filed April 18, 1933. I have also outlined suitable apparatus for carrying out such reactions in the same application. The present application describes further developments in the way of apparatus, such apparatus being meant to serve the same purpose as the apparatus described before, that is essentially for the reduction of magnetic oxide of iron to metallic iron and for the reverse reaction. It may equally well be used for reactions in which magnetic material serves strictly as a catalyst. To illustrate the operation of the apparatus in a specific application it will be assumed in the following that it is being used for the reduction of sponge iron from magnetite ground to pass 100 mesh at a temperature of 500 degrees C. by carbon monoxide gas.

The features of the reaction chamber described in this application are vertical shafts through which finely ground magnetic material drops at a rate essentially determined by the nature of the electric current which excites a series of magnets located in close proximity to the shafts and acting on the magnetic material. Under the influence of these magnetic forces the magnetic material arranges itself into an open structure easily permeable to a fluid reacting with the material. The shafts are arranged vertically, because gravity is assumed to be used as the pulling force that conveys the material through the apparatus. If other means are used for conveying the material through the apparatus, for instance if the fluid itself is utilized for that purpose, the conduits in question have not to be vertical. Only designs with vertical shafts that is designs utilizing gravity will be described in detail, as they illustrate the principle of the invention sufficiently.

In what has been said in the preceding paragraph it has been assumed that both solids and fluids pass through the shafts. In certain cases however the solids may remain stationary while only the fluids reacting with the solids pass through. This applies for instance to cases where the magnetic substance acts strictly as catalyst i. e. is not changed by the reaction. It also applies to cases where two fluids are made to react with the solids in succession. For instance metallic iron may in the first step be oxidized by steam forming magnetic iron oxide and then be reduced by water gas to metallic iron again in the second step.

According to the method in which the electric current which excites the magnets is applied two different types of construction are used and will be described. In type I the electric current is applied outside, in type II inside the reduction furnace.

In the drawing, Figure 1 is a diagrammatic showing of a type of apparatus which can be employed in conjunction with the various types of reaction chambers shown in detail in Figures 2 to 7 inclusive. Of these Figures 2 through 5 represent various chambers of type I, Figure 2 being a section taken through a reaction chamber, Figure 3 a plan view illustrating another form of chamber, while Figure 4 is a section taken along the line 4—4 of Figure 3 and Figure 5 is a section through another form of reaction chamber illustrating how the gases can be preheated.

In the reaction chambers of type II, Figures 6 and 7 are respectively sections taken along the lines 6—6 of Figure 7 and 7—7 of Figure 6.

The principle of the apparatus will best be understood by reference to Figure 1 wherein is shown a reaction chamber indicated generally at 4. This chamber comprises (Figure 2) a solenoid through which electric current may be made to flow. The solenoid contains a core (which can be one of the several special designs further to be described), made up of spool 11 on which the wire 12 is wound. Electric current, either direct or alternating, flows through the wire. The cylindrical hole of the spool 11 includes several spaced perforated discs, alternately of a magnetic material 13 like soft iron and non-magnetic material 14 which may be a metal, for instance copper or may be non-metallic, for instance fire-clay. It is also possible to leave out the non-magnetic discs in which case air acts as the non-magnetic material. It is essential, however, that the magnetic part of the apparatus be sub-divided in the general direction of the lines of force and consist of individual sections separated by non-magnetic spaces.

When powdered or granular material is poured through the solenoid it will be found that the magnetic action of the current makes individual flat magnets of the magnetic discs and the magnetic material attaches itself to these surfaces with a tendency to bridge across from one magnetic disc to the next. The magnetic particles attach themselves along the lines of force and form an open structure through which fluids may pass with only little obstruction, thus making possible a reaction between solids and fluids. In actual continuous operation, where the solids are to be passed through the reduction chamber, the current is periodically interrupted for short intervals or a slowly alternating current is used, as explained in the application previously referred to, which causes the magnetic particles to travel downward at a rate determined by the rate of interruption of the current. The material travelling downward is replaced by other material which is fed in at the top.

Means for feeding magnetic material to the reaction chamber as well as means for collecting the solid reaction product are shown in Figure 1 where conveyor 1 transfers material from hopper 2 to chute 3 into reaction chamber 4, typified by the apparatus shown here in detail. Material is collected in bin 6 while the reactant passes in through inlet 7 and outlet 8. They have been described in the copending application to which reference has already been made.

The fluid with which the solid particles are meant to react can either be made to enter at the top or bottom of the shaft formed by the perforations of the discs. The flow may either be continuous or pulsating.

The reaction chamber described with reference to Figure 2 may be increased in size as illustrated in Figures 3 and 4. In place of one perforation there are several which, having been widened in one direction, as shown in the drawing, assume the forms of slots 16. One dimension of these slots has to be kept small and preferably never greater than a few inches at the most so as to insure perfect retention of the magnetic particles by the magnets. There are no limitations to the length of the slots except those imposed by the mechanical character of the materials employed.

I have designated the parts 13 and 14 as discs but it is not at all necessary that they remain discs in reaction chambers designed for application in commercial operations. In that case the magnetic elements can be built up from rods, stampings or other forms to provide the frame. This is well known in the transformer art. Intimate contact of the individual members constituting such a frame is unnecessary, as they act independently from each other as parallel magnets. The principal considerations to be observed in the design of the frames are sufficient interconnection either between the members of the frames or with adjoining structural parts to secure mechanical strength and a certain limitation in the width of the slots so as to keep the distance through which the magnetic material has to be pulled within certain limits.

The apparatus described in this application is meant particularly to serve for reactions that require elevated temperatures and the heating effect of the electric current may be utilized to obtain such temperatures in cases where the materials entering the apparatus are not preheated to the required temperature. Generally speaking, when the apparatus exceeds a certain size the heating effect of the electric current should not be relied upon directly, as it would result in a stronger heating of the peripheral portions of the apparatus, while a uniform temperature all the way across is the ideal condition. On that account it is preferable in the case of large installations to utilize the electric heat indirectly by using it for preheating the gases entering the reduction chamber. This can be accomplished by enclosing the electric coil in a gas tight chamber into which the gases are led before entering the shafts of the reduction apparatus. This is illustrated in Figure 5. It will be noticed that the electric coil 12 is separate from the body of the reduction chamber and is enclosed in a special chamber 21 through which the gases to be preheated are passed by pipes 22 and 23. Chamber 21 may directly adjoin the walls of the system of shafts or there may be a space 24 between the two structures (as indicated in Figure 5) which prevents overheating of the peripheral shafts. The space in question may be a simple air space or may be filled with heat insulating material.

The heat produced by the electric current is of relatively smaller importance for large than for small installations as the efficiency of the machine, measured by pound of magnetic material per k. w., increase with increase in size and, therefore, where the heat required to preheat the reaction materials or the heat required for endothermic reactions is to be supplied in the form of electrical energy, the apparatus must be designed with this object in view. The simplest way for generating internal heat with the apparatus as described is using alternating current in connection with magnetic iron of considerable hysteresis.

I do not claim broadly that this design of a reaction chamber for the reaction between fluids and magnetic solids is superior to other possible constructions. For instance it is quite possible to utilize magnets of types such as are employed in magnetic ore separators. I do claim however that my design is decidedly superior to others for installations in large units due to the fact already pointed out that the efficiency of the machine increases with increases in size and that the machine therefore becomes highly efficient when the size approaches dimensions of the present standard commercial reduction apparatus for iron reduction, the blast furnace.

It has been explained above that reduction chambers of type I are not particularly designed for direct internal heating although they may be heated internally by utilizing alternating current and iron of considerable hysteresis. In type II, now to be described, a number of individually wound magnets are built directly into the reaction chamber, so that the heat generated in the coils is utilized directly for heating the reacting fluids. The individual magnets are relatively narrow strips of band iron 31 or other magnetic metal surrounded by coils 33 of magnet wire while others 32 are interposed between each two solenoids thus formed and are magnetized by the adjoining solenoids. The construction is illustrated in Figures 6 and 7. By assembling a number of solenoids together with the interposed strips, stacks of magnets result which are set up facing each other at some moderate distance from each other not exceeding say several inches preferably in such a way that opposite poles face each other as is indicated in Figure 7 wherein 34 is a north pole and 35 is a south pole.

A lining of nonmagnetic material such as copper can confine the individual stacks of magnets and forms the shafts through which the ore drops and the fluids pass. It goes without saying that the magnets are wound with due regard to the heat which they have to withstand which means that their insulation has to be heat resisting and asbestos covered wire can, for instance, be used.

The whole assembly is enclosed in a suitable container 36 preferably made of iron with two opposite side sheets 37 of a non-magnetic material such as copper, and the other two side sheets of iron. The iron strips of the outside stacks in Figure 7 are shown as magnetically connected by the side sheets 38. Similarly such magnetic interconnection may be provided for the inside stacks to magnetically connect the centers of these stacks. Such an interconnection of the inside stacks is however not indicated in the drawing.

The operation of the apparatus is identical to that of type I and does not need to be described. The only difference that makes itself felt when the apparatus is in use is that the heat produced in the magnet wire is set free inside the apparatus and is utilized for heating the reactants. The apparatus is in effect a reaction chamber utilizing a combination of magnets and electric heating elements.

It will be obvious that types I and II may be merged and reaction chambers designed which possess the characteristics of both types at the same time. For instance it is feasible to place some individually wound magnets or perhaps only heating coils within the reaction chamber of type I. Likewise other modifications within the spirit of this invention will be obvious to those skilled in the art.

I claim:—

1. In combination, means for supplying a finely divided magnetic material, means for supplying a material reacting with said magnetic material, and a reaction chamber for contacting said materials and comprising a plurality of series of elements composed of matter of high magnetic permeability separated by media of low magnetic permeability, said series of elements composed of matter of high magnetic permeability separated by media of low magnetic permeability individually bordering on at least one conduit for the passage of the reactants, at least one series bordering on two such conduits, said reaction chamber further comprising an electric solenoid so arranged that the electric current exciting it flows around at least part of said elements composed of matter of high magnetic permeability.

2. In combination, means for supplying a finely divided magnetic material, means for supplying a material reacting with said magnetic material, and a reaction chamber for contacting said materials and comprising a plurality of series of elements composed of matter of high magnetic permeability separated by media of low magnetic permeability, said series of elements composed of matter of high magnetic permeability separated by media of low magnetic permeability individually bordering on at least one conduit for the passage of the reactants, at least one series bordering on two such conduits, said reaction chamber further comprising an electric solenoid surrounding the reaction chamber and magnetizing said elements composed of matter of high magnetic permeability.

3. A reaction chamber for the reaction of finely divided magnetic substance with fluids comprising a plurality of series of elements composed of matter of high magnetic permeability separated by media of low magnetic permeability, said series of elements composed of matter of high magnetic permeability separated by media of low magnetic permeability individually bordering on at least one conduit for the passage of the reactants, at least one series bordering on two such conduits, said reaction chamber further comprising an electric solenoid surrounding the reaction chamber and magnetizing said elements composed of matter of high magnetic permeability as well as means for utilizing the heat set free in the solenoid for preheating said fluids.

4. In combination, means for supplying a finely divided magnetic material, means for supplying a material reacting with said magnetic material, and a reaction chamber for contacting said materials and comprising a plurality of series of elements composed of matter of high magnetic permeability separated by media of low magnetic permeability, said series of elements composed of matter of high magnetic permeability separated by media of low magnetic permeability individually bordering on at least one conduit for the passage of the reactance, at least one series bordering on two such conduits, said reaction chamber further comprising an electric solenoid individually surrounding and magnetizing an element composed of matter of high magnetic permeability.

5. In combination, means for supplying a finely divided magnetic material, means for supplying a material reacting with said magnetic material, and a reaction chamber for contacting said materials and comprising a plurality of series of elements composed of matter of high magnetic permeability separated by media of low magnetic permeability, said series of elements composed of matter of high magnetic permeability separated by media of low magnetic permeability individually bordering on at least one conduit for the passage of the reactants, at least one series bordering on two such conduits, said reaction chamber further comprising electric solenoids individually surrounding and magnetizing a plurality of elements composed of matter of high magnetic permeability.

6. In combination, means for supplying a finely divided magnetic material, means for supplying a material reacting with said magnetic material, and a reaction chamber for contacting said materials and comprising a plurality of series of elements composed of matter of high magnetic permeability separated by media of low magnetic permeability, said series of elements composed of matter of high magnetic permeability separated by media of low magnetic permeability individually bordering on at least one conduit for the passage of the reactants, at least one series, bordering on two such conduits, said reaction chamber further comprising electric solenoids individually surrounding and magnetizing alternate individual elements composed of matter of high magnetic permeability.

7. In combination, means for supplying a finely divided magnetic material, means for supplying a material reacting with said magnetic material, and a reaction chamber for contacting said materials and comprising a plurality of series of elements composed of matter of high magnetic permeability separated by media of low magnetic permeability, said series of elements composed of matter of high magnetic permeability separated by media of low magnetic permeability individually bordering on at least one conduit for the passage of the reactants, at least one series bordering on two such conduits, said reaction chamber further comprising electric solenoids, individually surrounding and magnetizing alternate individual elements composed of matter of high magnetic permeability of each series.

8. In combination, means for supplying a finely divided magnetic material, means for supplying a material reacting with said magnetic material, and a reaction chamber for contacting said materials and comprising a plurality of series of elements composed of matter of high magnetic permeability separated by media of low magnetic permeability, said series of elements composed of matter of high magnetic permeability separated by media of low magnetic permeability individually bordering on at least one conduit for the passage of the reactants, at least one series bordering on two such conduits, said reaction chamber further comprising electric solenoids individually surrounding and magnetizing alternate individual elements composed of matter of high magnetic permeability of each series, elements composed of matter of high magnetic permeability of at least one series being magnetically interconnected.

9. In combination, means for supplying a finely divided magnetic material, means for supplying a material reacting with said magnetic material, and a reaction chamber for contacting said materials and comprising a plurality of series of elements composed of matter of high magnetic permeability separated by media of low magnetic permeability, said series of elements composed of matter of high magnetic permeability separated by media of low magnetic permeability individually bordering on at least one conduit for the passage of the reactants, and an electric solenoid surrounding the reaction chamber and magnetizing said elements composed of matter of high magnetic permeability.

RUDOLF GAHL.